Nov. 17, 1964    D. F. COMSTOCK, JR    3,157,728
METHOD AND MEANS FOR MEASURING HIGH TEMPERATURES
Filed March 2, 1961    6 Sheets-Sheet 1

Daniel F. Comstock, Jr.
*INVENTOR.*

BY
Attorney

Nov. 17, 1964     D. F. COMSTOCK, JR     3,157,728
METHOD AND MEANS FOR MEASURING HIGH TEMPERATURES
Filed March 2, 1961     6 Sheets-Sheet 2

Daniel F. Comstock, Jr.
*INVENTOR.*

BY
Attorney

Daniel F. Comstock, Jr.
INVENTOR.

Nov. 17, 1964 D. F. COMSTOCK, JR 3,157,728
METHOD AND MEANS FOR MEASURING HIGH TEMPERATURES
Filed March 2, 1961 6 Sheets-Sheet 4

Daniel F. Comstock, Jr.
INVENTOR.

BY
Attorney

Nov. 17, 1964  D. F. COMSTOCK, JR  3,157,728
METHOD AND MEANS FOR MEASURING HIGH TEMPERATURES
Filed March 2, 1961  6 Sheets-Sheet 5

Daniel F. Comstock, Jr.
INVENTOR.

BY
Attorney

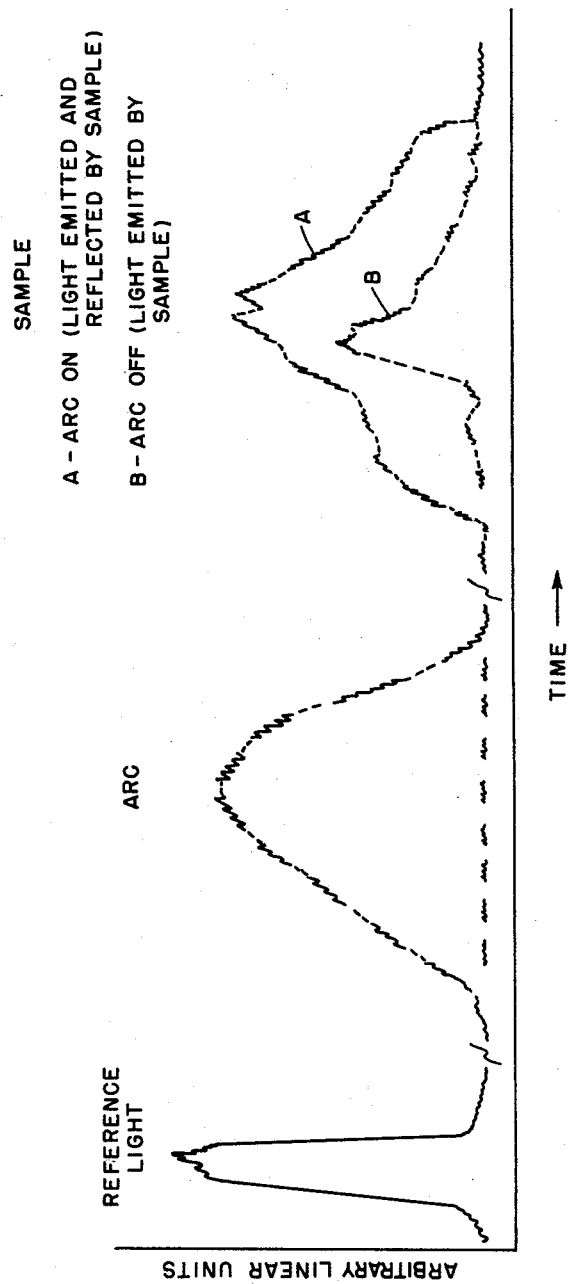

3,157,728
METHOD AND MEANS FOR MEASURING HIGH TEMPERATURES
Daniel F. Comstock, Jr., Cohasset, Mass., assignor to Arthur D. Little, Inc., Cambridge, Mass., a corporation of Massachusetts
Filed Mar. 2, 1961, Ser. No. 92,796
7 Claims. (Cl. 88—22.5)

This invention relates to a measurement method and apparatus for determining the temperature of a hot body and more particularly to method and apparatus of the character described for rapidly and accurately determining the temperature of bodies which are being subjected to treatment in an arc imaging furnace or similar device.

The pyrometer of this invention is applicable to a device having an optical path in which there is an intermediate image of a sample and a radiant energy source so positioned that it is possible to view first the sample and then the radiant energy source. There is now available on the market arc imaging furnaces; one particular one being described in a copending application Serial No. 857,075, filed in the names of Fred F. Chellis, Peter E. Glaser and Russell J. Ayling, now U.S. Patent No. 3,103,574. In arc imaging furnaces of this nature the optical path provides a crossover point where there is an intermediate image of both the sample and the arc and these are used to determine by the process and apparatus of this invention the temperature of the sample being subjected to the radiant energy from the arc.

It will be appreciated that in high temperature investigations such as are associated with an arc imaging furnace that it is necessary to determine accurately and rapidly the temperature of the sample. Pyrometers of the prior art have been designed for use in furnaces and the like where a fairly uniform internal temperature distribution could be expected. This made it possible to obtain sample temperatures by means of thermocouples or by the use of pyrometers applied to a sighting hole which emitted essentially black-body radiation. However, pyrometers of this nature are not adaptable to measuring the temperature of unenclosed non-black samples, or small samples, nor are they capable of operating in the conditions of extremely high temperature gradients which the samples reach in the treatment encountered in an arc or solar furnace.

Moreover, the various types of radiation pyrometers now known possess certain operational drawbacks. In some, for example a total radiation pyrometer, it is necessary to assume an average emittance and any error in such an assumption can result in a sizable error in the resulting temperature measurements. In others, such as in a standard two-color pyrometer, the unknown emittance can be eliminated by taking ratios of the radiant intensities from the sample at two different wave lengths, but the operation of this type pyrometer is valid only if the emittance is essentially the same at the two wave lengths.

The so-called optical pyrometer is accurate for making temperature measurements of materials of known emittance, but it is relatively slow to operate and limited to the visible region of the spectra to which the human eye responds. Moreover, these optical pyrometers determine a temperature value by attaining a null point which requires setting the instrument in one fashion or another and they are of such construction that they could not be readily adaptable to measuring the temperature of a sample in an arc imaging furnace.

Another difficulty often encountered in radiation pyrometry is than the angle of view from a conventional pyrometer is so narrow that the natural variations in distribution of radiation from a hot flat face produce unreliable temperature determinations. Further, determinations of emittance by methods of reflected light using narrow-angle optics are subject to considerable error due to the natural variations in reflectance and emittance of various sample materials as a function of the angle of view.

The apparatus and method of this invention make it possible to determine the emittance of the sample, using very wide-angle optics, thus overcoming the disadvantage of some of the prior art pyrometers discussed above. Moreover, the pyrometer of this invention has an extremely fast response making it possible to eliminate the drawbacks associated with optical pyrometers. Finally, the data obtained in the form of an oscillogram which can be reduced to mathematical ratios permit an easy, rapid and accurate determination of the temperature of a sample body.

It is therefore a primary object of this invention to provide method and apparatus for accurately and rapidly determining the emittance of a sample body subjected to intense radiant flux simultaneously with determination of its temperature under the same conditions. It is another object of this invention to provide method and apparatus of the character described which provide data in a readily handled form. It is another object to provide a pyrometer adaptable to new high temperature techniques, e.g., an arc imaging furnace. It is yet another object to provide a pyrometer which is flexible in the type of information which may be determined. It is yet another object to provide a pyrometer simplified in its construction by virtue of dual use of arc furnace optics for pyrometric as well as heating purposes.

It is another primary object of the method and apparatus of this invention to minimize or even eliminate errors in temperature measurement due to variations of emittance and reflectance with angle, or due to a lack of knowledge of the emittance under the conditions of temperature measurement. Another object is to provide a pyrometer of the character described which incorporates the automatic determination of the emittance of the sample thus eliminating previous difficulties brought about by not being able to make such determinations. It is yet another object to provide a means for accurately measuring very high temperatures of samples, in the range from about 2000–4000° K., or higher. These and other objects will become apparent in the following description of this invention.

The pyrometer of this invention is particularly adapted to be used to measure the temperature of a sample heated by a source of radiant flux which is directed onto the sample by an optical path providing an intermediate image of the sample and an intermediate image of the source. The pyrometer comprises radiant energy detecting means, sample viewing means adapted to periodically view said image of said sample and to transmit radiant energy therefrom to said radiant energy detecting means, source viewing means adapted to periodically view said source of radiant flux and transmit radiant energy therefrom to said radiant energy detecting means, chopper means located between said source of radiant flux and said sample viewing means and adapted to periodically cut off said radiant flux from said sample, and driving means associated with and coordinating the operation of said sample viewing means, said source viewing means and said chopper means whereby said sample viewing means and said source viewing means alternately transmit radiant energy to said radiant energy detecting means and said chopper means periodically cuts off said radiant flux reaching said sample whereby said sample viewing means alternately transmits radiant energy emitted by said sample, and radiant energy reflected plus radiant energy emitted by said sample, to said radiant energy detecting means.

According to this invention a novel method is provided for measuring temperatures of sample bodies heated to extremely high temperatures by a source of radiant flux. The method comprises the steps of alternately viewing the image of said source and the image of said sample body, chopping said radiant flux reaching said sample body whereby said viewing of said sample body comprises alternately viewing said sample body with and without said radiant flux striking it, and determining the relative intensities of the radiant energy emitted by said source, of the radiant energy emitted and reflected by said sample body when said radiant flux strikes it and of the radiant energy reflected by said body when said radiant flux is cut off by said chopping.

The pyrometer of this invention and the method of measuring temperature will be more fully described with reference to the accompanying drawings in which.

Figure 2:
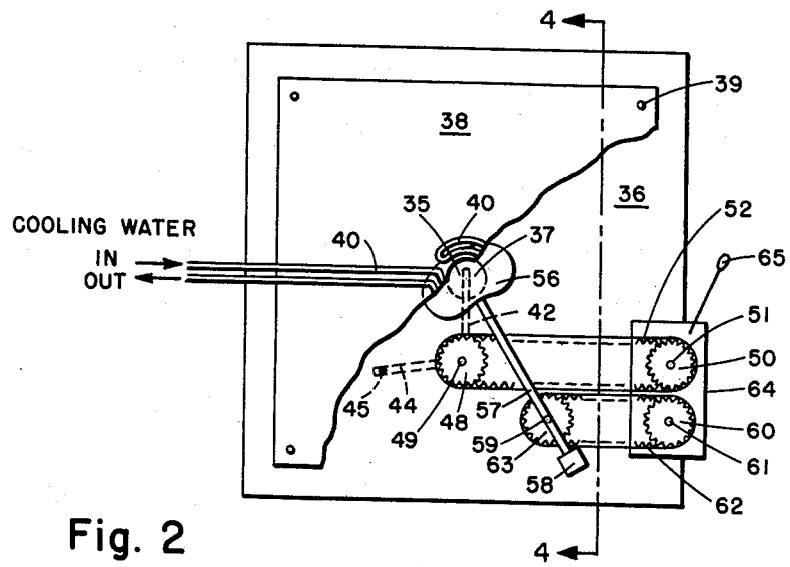
FIG. 2 is a view of the pyrometer and its mounting from the arc end of the apparatus.
Figure 3:
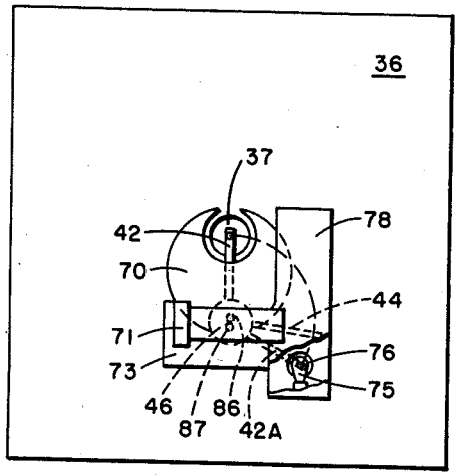
FIG. 3 is a view of the pyrometer and its mounting from the sample end of the apparatus.
Figure 4:
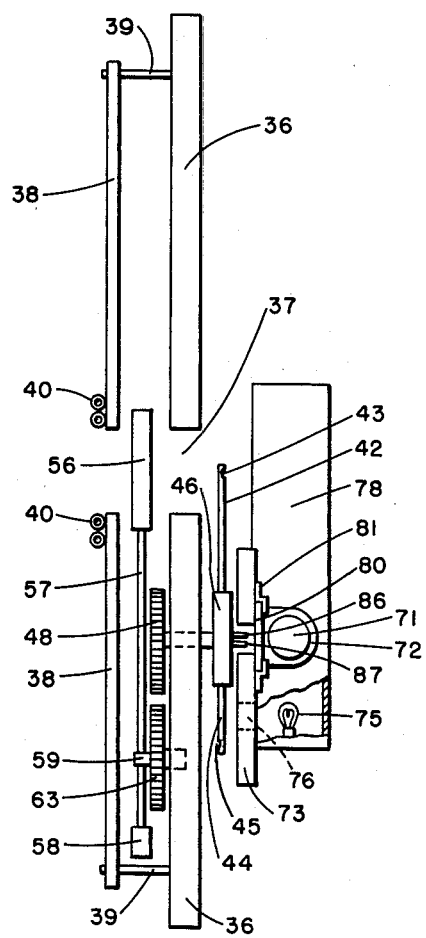
Figure 5:
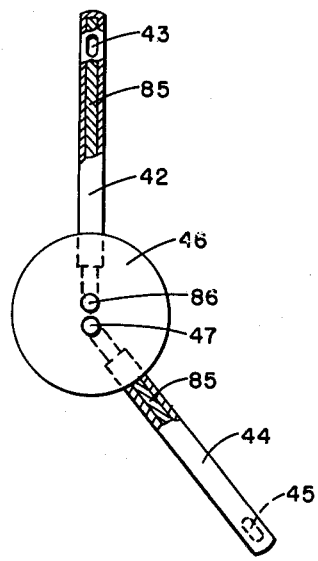
Figure 6:
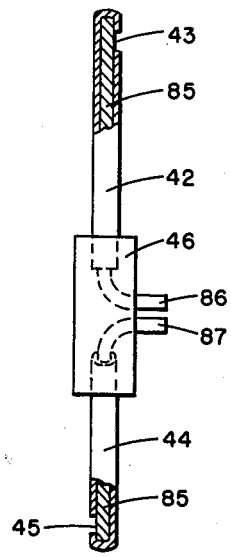
Figure 7:
Figure 8:
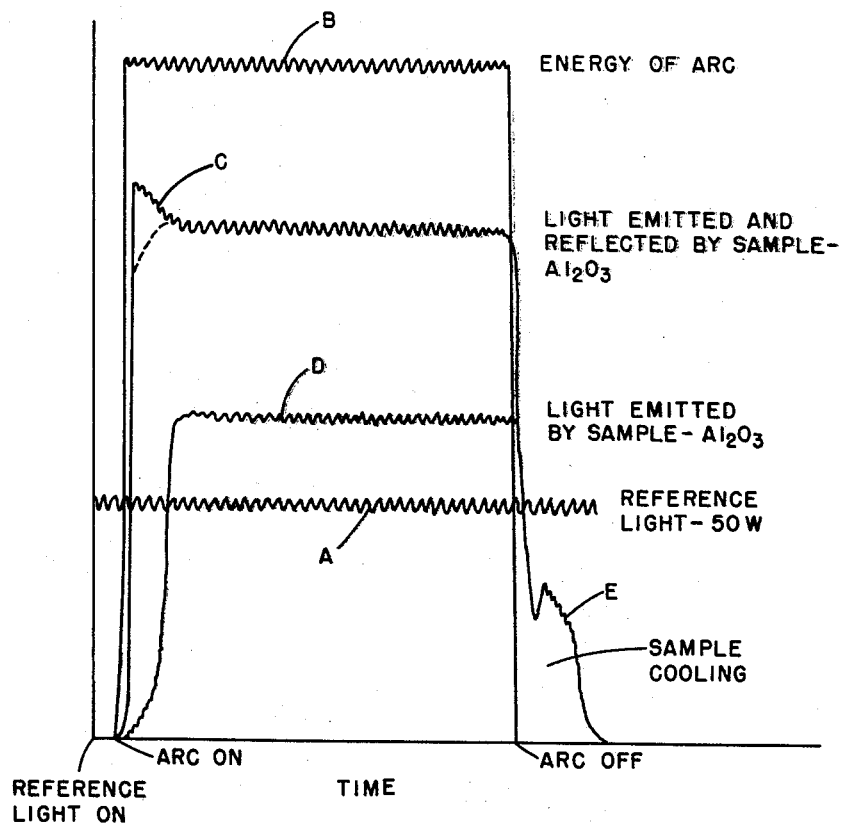

FIG. 4 is a cross-sectional view of the pyrometer taken along line 4—4 of FIGS. 2 and 3, with protective shield 70 removed for better presentation;

FIG. 5 is a front plan view from the sample end of the periscope wheel and periscopes partially cut away;

FIG. 6 is a side view of the wheel and periscopes of FIG. 5;

FIG. 7 is a schematic diagram of the electronic equipment associated with the pyrometer;

FIG. 8 is a reproduction of a typical oscillogram record for a slow mode of operation showing the superpositioning of traces of the arc, sample and reference light; and FIG. 9 is a reproduction of a typical oscillogram trace for a fast mode of operaton showing in order the reference light source, the arc and the sample.

GENERAL DESCRIPTION

The disadvantages of the prior art measuring devices are overcome in the pyrometer of this invention by viewing the sample from a very wide angle to average out the angular variations in emitted and reflected light and by determining the emittance of the sample by finding the reflectance of the sample in the operating wave length and then using Kirchhoff's law to determine emittance.

To determine the temperature of the sample, it is first necessary to determine the emittance of the sample. This may be done by first finding the reflectance of the sample at the operating wave length of the pyrometer and then utilizing Kirchhoff's law which states that the sum of the spectral emittance and spectral reflectance of a sample is equal to one. An auxiliary problem in obtaining the emittance of the sample from the sample's reflectance is the measurement of the reflectance. This may be done by measuring the incident light, the reflected light from the sample, and the emitted light from the sample. By subtracting the emitted light alone from the total light leaving the sample, the reflected light alone is determinable. By knowing the incident light, it is possible to form the ratio of reflected light to incident light, and this ratio by definition is the reflectance of the sample at a given wave length. By subtracting this ratio from one, according to Kirchhoff's law, the spectral emittance is obtained. This value of emittance can then be inserted together with a radiation measurement into Planck's law for grey bodies, or Wien's approximation of Planck's law to obtain the true temperature of the sample.

The pyrometer of this invention measures, in sequence, the incident energy on the face of the sample, the radiation leaving the sample, and the radiation emitted from the sample alone. By combining these three pieces of information the emittance is calculated and the true temperature of the sample is determined.

To measure these three radiation quantities the pyrometer is placed at the crossover point in the arc furnace. Small periscopes constructed from hypodermic needles are inserted at the crossover point into the intermediate images of the arc end of the sample. There are two such periscopes, one facing toward the arc called the arc periscope, the other toward the sample called the sample periscope. These periscopes are scanned through the crossover images periodically. The light from these periscopes is fed to a photocell, and the output of this photocell is fed through amplifiers to a fast oscillograph which permanently records oscillograms of the scan. Typical sequences of profiles appearing on the oscillogram obtained fo rtwo modes of operation are illustrated in FIGS. 8 and 9 which will be discussed below in connection with an example of a temperature determination.

As the periscopes scan the crossover images, the following record is obtained in sequence on the oscillogram. First the arc periscope generates an oscillogram which represents a physical profile of the radiation emited by the arc at each point. This profile starts at one cool edge of the arc image, scans slowly across the arc image, reaches a peak of intensity at the middle, and dies off symmetrically as the arc periscope pulls out of the image toward the other cold edge if the slow mode of operation is used. If the fast mode is employed the scan trace is essentially rectangular in overall form being comprised of many rapid vertical scans. The next act that occurs is that the sample periscope scans through the image plane at the crossover point and, similarly to the arc periscope, generates a radiation profile of the hot sample. This profile starts at one cold side of the hot spot, scans slowly or rapidly depending on the mode of operation, reaches a peak at the center, and again dies away as it approaches the other side.

Periodically at fast chopper completely removes arc energy from the sample for a very short period of time, of the order of five milliseconds. During this five millisecond interval the sample periscope sees only light emitted by the sample. During the rest of the cycle, however, the sample periscope sees both the emitted and the reflected light from the sample. Thus the radiation profile of the sample during a scan in the slow mode of operation appears similar to the arc profile which has the general appearance of a bell shaped curve, but with this difference, the sample profile has brief sharp dips representing the chopper obliteration of arc light illuminating the sample. One of these dips occurs every sixty-five milliseconds. In a typical sample profile there will be ten dips across the profile. If the points represented by the bottom of each of these dips is joined by a curve, as is done by the dotted lines of FIG. 9, then this curve will represent the profile of the emitted only radiation from the sample. The overall profile as mentioned earlier represents the emitted plus reflected light. The difference between these two profile curves represents the reflected light profile. If in addition the incident light were to be determined, all the necessary information is available from which the emittance of the unknown sample may be determined. Essentially the same type of information is obtained in the fast mode of operation in which only maximums are recorded rather than a detailed profile of temperature.

There is no known easy direct method of measuring incident light. However, a very good determination of incident light and its distribution across the sample face may be made using the assumption that the image of the arc at the crossover point in a good representation of the same image as it falls finally on the sample as incident light. The problem then becomes that of determining the profile of the arc (which has already been done with the scan of the first periscope) and of determining how much this energy has been degraded by the optical system before it reaches the sample. As will be shown under the next section, the degradation of this image and intensity is easily determined by a calibration procedure. It is assumed that the degradation of light intensity between the arc image at the crossover point and its final intensity as it reaches the sample is constant. This is a reasonable assumption because the degradation depends on stable factors such as the reflectivity of the re-imaging mirror and on some geometric losses.

THE APPARATUS

Before discussing the theory and operation of the pyrometer of this invention, the pyrometer itself as an apparatus will be described in detail with reference to the drawings.

Figure 1:
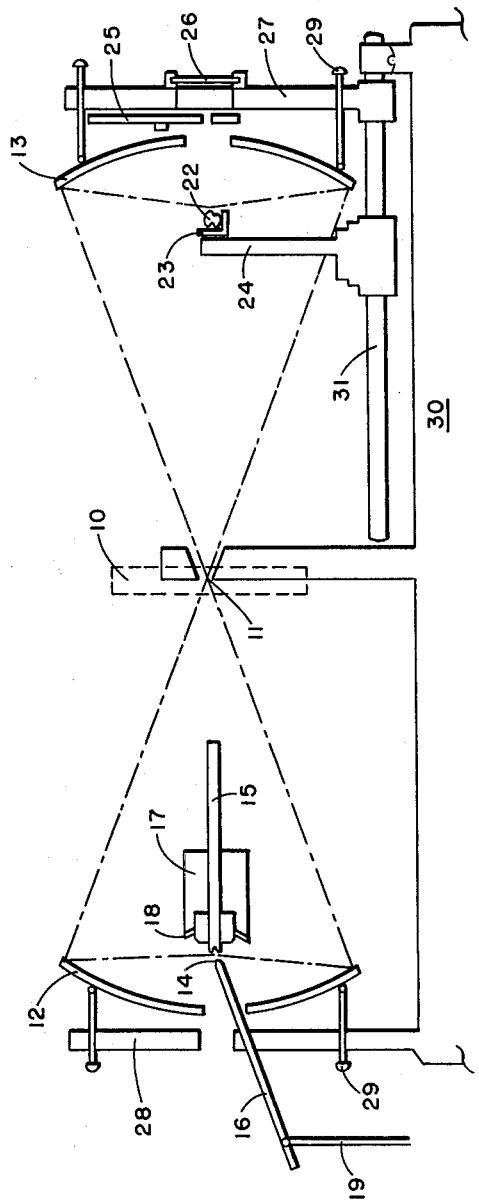
FIG. 1 is a schematic drawing of an arc imaging furnace typical of the apparatus to which the pyrometer of this invention is applicable.

In FIG. 1 there is reproduced a schematic diagram of an arc imaging furnace such as that to which the pyrometer of this invention is applicable. In FIG. 1, box 10 illustrates the general location of the pyrometer at the crossover point 11 of the beams of light reflected by parabolic mirrors 12 and 13. The left hand portion of the figure will be referred to as the arc end of the furnace, while the right hand portion will be referred to as the sample end.

Turning now to the arc end of the arc imaging furnace, it will be seen that there is provided an arc 14 formed across the end of an anode 15 and a cathode 16. The anode is supported by suitable support 17 which is equipped with an auxiliary mirror 18. The cathode in its turn is mounted on an adjustable mounting support 19 which makes it possible to adjust the position of the arc. It will be appreciated that there are many other auxiliary elements associated with the arc imaging furnace which are not illustrated in FIG. 1 because they do not form a part of the apparatus or method of this invention. A typical arc imaging furnace such as that sketched in FIG. 1 is described in detail in the above-identified co-pending application Serial No. 857,075.

Turning now to the sample end of the arc imaging furnace, it will be seen that sample 2, which is to be subjected to the radiant flux of the arc (and the temperature of which is to be measured) is placed in sample holder 23 which in turn is held in position by a sample holder mount 24. As in the case of the arc end of the furnace a number of auxiliary elements are included, among which are shown a viewing shutter 25 and a smoked glass viewing port 26, which are mounted on a vertical support 27. This vertical support 27 along with a comparable vertical support 28 associated with the arc end serve as the main vertical mounts and through them pass mirror alignment screws 29 used to align the two parabolic mirrors 12 and 13. Finally, these vertical supports 27 and 28 are attached to a main base mounting 30 and there is also provided a mounting 31 for an optical bench which is not shown in detail.

The pyrometer of this invention indicated generally as 10 in FIG. 1 is shown in detail in FIGS. 2–6. FIG. 2 views the pyrometer from the arc end while FIG. 3 views it from the sample end, and FIG. 4 is a cross-sectional diagram which is a composite of FIGS. 2 and 3. These three figures will now be considered in the following description.

The pyrometer is supported and mounted on a main vertical support plate 36 which has an opening or hole 37 through it. The support plate 36 is in turn so located in the arc imaging furnace that the center of the opening will coincide with the crossover point 11 of the light beams (FIG. 1).

Turning now more specifically to FIGS. 2 and 4, there will be shown there a shielding plate 38 which is spaced away from main vertical support plate 36 by means of suitable spaced screws 39. In shielding plate 38 there is an opening 35 corresponding to opening 37. Around opening 35 in the shielding plate 38 are welded copper coils 40 through which cooling water is continually circulated to cool the plate. Cooling is necessary because of the intense radiation falling on the pyrometer from the arc.

As explained above, the apparatus of this invention employs small periscopes which are periodically brought into position at the crossover point of the light beams which in this case means that they are periodically scanned through opening 37. The sample periscope 42 is shown in a position to receive radiant energy from the sample in FIGS. 2, 3 and 4. The window 43 in the periscope 42 is illustrated and will be further described with reference to FIGS. 5 and 6. Likewise, the arc periscope 44 having a window 45 is shown in the position in FIGS. 2, 3 and 4 which it would occupy when the sample periscope 42 is receiving radiant energy from the sample.

The periscopes 42 and 44 are mounted on a periscope wheel 46 which, as will be seen in FIG. 4, is mechanically attached to a gear 48 through a shaft 49 which passes through main vertical support plate 36. A periscope wheel drive gear 50 maintained on shaft 51 drives the periscope gear 48 through a suitable timing belt 52 which provides that no backlash and no slippage will be experienced in the system and that the periscope wheel will always be coordinated with the chopper drive as explained below.

Associated with the pyrometer is a chopper 56 which is mounted to a chopper extension 57, on the other end of which is a counterweight 58. This is driven by a shaft 59 which in turn is driven by a chopper gear 63. Comparable to the periscope wheel drive there is provided for the chopper a driving gear 60 on shaft 61 and a timing belt 62 which connects drive gear 60 with chopper gear 63. The driving mechanism is mounted in a suitable housing 64 and is equipped with a gearing switch 65 to make it possible to change the rate at which the periscope wheel 46 is rotated. The variation in periscope wheel speed 46 will be described in detail below. The gear shift and the synchronous-drive motor associated with the driving mechanism is standard equipment and need not be discussed or illustrated further.

Turning now to FIGS. 3 and 4 and viewing the pyrometer from the sample end of the arc furnace, it will be seen that there is provided a protective shield 70 (which is omitted from FIG. 4) around opening 37. The purpose of this shield is to protect the delicate mechanism of the periscopes and to prevent anything from getting in the way of the periscope rotation. The radiant energy reaching the periscope windows either from the arc or from the sample is detected by a photomultiplier tube 71 in housing 72, which in turn is mounted on a housing mount 73.

Associated with this portion of the pyrometer is also a reference light 75 positioned in front of a small opening 76 in the mounting 73. The opening 76 is so located that the sample periscope can pick up radiation from the reference light as it is rotated to position 42A (FIG. 3). The purpose of the reference light will be described further below. In order to protect personnel and equipment from the intense heat of the reference light, there is provided a chimney 78. It will be appreciated that any other suitable arrangement offering the necessary protection can be used and that this chimney is illustrative of only one method for accomplishing this.

Turning now specifically to FIG. 4, it will be seen that there is provided a filter 80 between the quartz light pipes 86 and 87 (to be described in detail below) and photomultiplier tube 71. This filter 80 is placed in a suitable filter mount 81.

FIGS. 5 and 6 illustrate in detail the sample and arc periscopes which pick up radiant energy and transfer it to the photomultiplier tube. For purposes of illustration the periscopes are shown as being considerably thicker than they are in actual practice. These periscopes are conveniently platinum hypodermic needles and it will be appreciated that the ratio of length to diameter is much greater than that indicated in FIGS. 5 and 6. In these figures it will be seen how the sample periscope 42 and arc periscope 44 are equipped with windows 43 and 45, respectively. They are maintained in the periscope wheel as illustrated in FIG. 6. The periscopes are comprised of hypodermic needles into which are inserted quartz light pipes 86 and 87 which operate on the known principle of total internal reflection. The quartz conducts light around a right angle so that the light transmitted by light pipes 86 and 87 becomes parallel with the axis of the periscope wheel 46. Light falling on the windows 43 or 45 is transmitted through quartz 85 and emitted by the light pipes 86 and 87 through filter 80 onto the photomultiplier tube 71 (see FIG. 4).

The use of quartz ground at each end projecting from the needles as light pipes 86 and 87 permits the periscopes to have a wide angle of visibility without discriminating against any particular angle. The use of the hypodermic needles without the quartz as periscopes would discriminate against light arriving from certain angles. The advantage of total internal reflection would be lost and the amount of light reaching the photocell would be considerably less. Moreover, the number of bounces the light makes inside the platinum is dependent on the angle of entry and, therefore, in effect this creates an angular sensitivity to received light which does not exist when quartz is used to fill the platinum tube.

It is preferred to bring the light pipes to the axis of the light wheel before being aimed at the photocell because, in general, photocells do not have uniform cathodes and cannot be relied upon to give an equal signal for light falling at various points on the cathode. Therefore, it is essential that any light brought to fall on the photomultiplier cathodes should always fall at the same average position and also be spread over the cathode. Furthermore, it is preferred to provide diffusion at the beginning and the end of the light pipes to further reduce angular sensitivity.

Platinum and quartz for the light pipe materials are chosen in preference to other materials in the apparatus shown because other materials will not stand the occasional exposure to high temperatures that exist at the crossover point. The equilibrium temperature at the crossover point is about 1700° F. for the arc imaging furnace illustrated in FIG. 1. That is, if a thermocouple of any unspecified total reflectivity were placed at this point it would indicate a temperature of about 1700° F. In practice, under such conditions, brass, for example, will be melted, and glass would be softened. The combination of quartz and platinum may be run for an indefinite period at the crossover point without any danger of destruction or loss of sensitivity. Of course, other metals such as rhodium, iridium and the like may also be used, while other light pipe material such as sapphire may be substituted for the quartz.

FIG. 7 is a schematic diagram of the electronic equipment associated with the pyrometer. Radiant energy falling upon the photomultiplier tube is transmitted to an adjustable gain amplifier and then to a fast recording oscillograph which is capable of recording the relative radiant energy in traces such as illustrated in FIG. 8.

THEORY AND USE OF OSCILLOGRAM TRACINGS TO DETERMINE TEMPERATURE

To determine the temperature of a sample from the pyrometer oscillogram there are two separate calculations which must be made. These are basically independent and include the calculations of emittance and temperature.

A. *Calculation of Emittance*

First, the spectral emittance must be calculated from Kirchhoff's law.

$$\epsilon_\lambda = 1 - \text{spectral reflectance} = 1 - \frac{r_\lambda}{i_\lambda} = 1 - \frac{(r_\lambda + e_\lambda) - e_\lambda}{i_\lambda} \quad (1)$$

where $r_\lambda$ = reflected light from the sample
$e_\lambda$ = emitted light from the sample
$i_\lambda$ = incident light on the sample
$\epsilon_\lambda$ = the spectral emittance of the sample Since the optical and electronic components of the pyrometer have a certain sensitivity which is the same for the measurement of $r_\lambda$ and $e_\lambda$ $$r_\lambda = k_1 R_\lambda; \quad e_\lambda = k_1 E_\lambda; \text{ and } i_\lambda = k_2 k_3 A_\lambda$$

where $R_\lambda$ = the oscillogram indication of reflected light
$E_\lambda$ = the oscillogram indication of emitted light
$A_\lambda$ = the oscillogram indication of arc light
$k_1$ = pyrometer sensitivity through the sample periscope
$k_2$ = pyrometer sensitivity through the arc periscope
$k_3$ = that fraction of light from the arc image which reaches the sample as incident light Using these relations (1) may be written $$\epsilon_\lambda = 1 - k_1 \frac{(R_\lambda + E_\lambda) - E_\lambda}{k_2 k_3 A_\lambda} = 1 - K \frac{(R_\lambda + E_\lambda) - E_\lambda}{A_\lambda} \quad (2)$$

where $K$ = a combined constant of the arc furnace and the pyrometer apparatus.

$K$ in Equation 2 may be evaluated by substituting a material of known emittance in place of the sample in the arc furnace with the arc light on. Under these conditions a known fraction (such as 95%) of the arc light falling on the sample will be reflected back through the re-imaging mirror to the sample periscope. $R_\lambda$, $E_\lambda$ and $A_\lambda$ may be measured and Equation 2 used to solve for K. Once this value of K has been determined, it may be used henceforth in the determination of unknown emittances.

It is convenient to use a cooled sample of known emittance because a cool sample emits no radiation ($E_\lambda = 0$) and its surface state is stable. The value of K so determined (typically 0.35) is then used in subsequent calculations for unknown emittances. For example, on the oscillograms shown in FIGS. 8 and 9 typical record amplitudes at the hottest point of the sample will be about 4.5 for the emitted plus reflected light from the sample, 2.75 for the emitted light alone, and 4.75 for the arc amplitude. If these values are put into Equation 2, the calculated spectral emittance will be 0.75. Notice that these amplitudes are read from the oscillogram in arbitrary units since only a ratio is required. Furthermore, any slow drifts in amplifier gain, photomultiplier sensitivity, and the like do not cause errors in this calculation because the emitted and reflected radiation is measured on the same scale. Also the fact that the arc and sample periscopes in general do not transmit the same amount of light does not affect the accuracy of these calculations since again such differences, providing they remain constant, are all absorbed in the constant K.

A convenient material of known emittance for the determination of K is magnesia smoke deposited onto a water-cooled copper block. The block is coated with clean magnesia by burning a magnesium ribbon near and underneath the copper surface. The resulting deposit is clean, uniform and very white, having an estimated reflectance of between 95% and 97%. This surface may be wiped off the copper and redeposited for each new determination. The major advantage of this very white material over a grey material of estimated emittance is that the errors due to incorrect estimation are apt to be less. For example, a material of estimated reflectance of 0.5 might easily have a true reflectance of 0.4 to 0.6 that is ±20%. However, a white block of estimated reflectance of 0.96 will have a true emittance no greater than 1.0 and is unlikely to have a value 20% lower than the estimated value, that is 0.96−20%=0.77.

There are two essential conditions for accuracy in the emittance determination: first, that the electronic or other parts of the instrumentation do not drift appreciably in the short time interval between an arc profile measurement and a sample profile measurement. This time is about one second. The second condition for accuracy is that the water-cooled white block test be performed with the furnace in the same focus as was used on the sample. If this focus condition is not adhered to, the true K value of Equation 2 will be different in the sample determination than determined by the white block test, and the value for emittance of the sample so determined may be inaccurate.

B. *Calculation of Temperature*

A second calculation that must be made is the temperature determination itself. Wien's approximation of Planck's law for nonblack bodies is $$P = \epsilon c_1 \lambda^{-5} \Delta\lambda e^{-\frac{c_2}{\lambda T}} \quad (3)$$

where $P=$ the power radiated in a wave length band $\Delta\lambda$ from a unit area of hot surface which has a spectral emittance of $e_\lambda$, within a unit solid angle
$\lambda=$ the wave length under consideration
$T=$ the true absolute temperature of the surface
$c_1$ and $c_2$ are constants The constants of Equation 3 may be specified or eliminated in practice in the present apparatus by temporarily substituting a standard lamp of known black body temperature in place of the sample.

$$\frac{P}{P_L} = \frac{k_1 E}{k_1 E_L} = \frac{\epsilon_\lambda c_1 \lambda^{-5} \Delta\lambda e^{-\frac{c_2}{\lambda T}}}{\epsilon_{\lambda L} c_1 \lambda^{-5} \Delta\lambda e^{-\frac{c_2}{\lambda T_{L0}}}} = \frac{\epsilon_\lambda e^{-\frac{c_2}{\lambda T}}}{\epsilon_{\lambda L} e^{-\frac{c_2}{\lambda T_{L0}}}}$$

which may be rearranged $$\frac{1}{T_{L0}} - \frac{1}{T} = \frac{\lambda}{c_2} \ln \left[ \frac{E \epsilon_{\lambda L}}{E_L \epsilon_\lambda} \right] \quad (4)$$

where $E=$ sample emitted light signal on oscillogram
$E_L=$ lamp emitted light signal on oscillogram
$k_1=$ a constant of the pyrometer apparatus defined previously
$\epsilon_\lambda=$ sample emittance defined previously
$\epsilon_{\lambda L}=$ lamp emittance
$T=$ sample temperature
$T_{L0}=$ lamp true temperature If $T_L=$ an equivalent black body lamp filament temperature as observed with a laboratory radiation pyrometer, then the lamp filament emittance can be eliminated and Equation 4 can be written $$\frac{1}{T_L} - \frac{1}{T} = k\lambda \log \left[ \frac{E}{E_L} \frac{1}{\epsilon_\lambda} \right] \quad (5)$$

where $k=$ a constant which absorbs $$\frac{1}{c_2}$$

and incidentally also converts ln to log for convenience.

The effective wave length of operation, $\lambda$, of the pyrometer is determined by the cutoff properties of the filter (in this case red glass) and the wave length response of the photomultiplier. In the apparatus illustrated it is about 0.65 micron.

The exact value of $k\lambda$ may be determined by operating the arc furnace pyrometer with the standard lamp set successively at two different temperatures, $T_1$ and $T_2$. Under these conditions, $$k\lambda = \frac{T_1 - T_2}{T_1 T_2 \log \frac{E_1}{E_2}} \quad (6)$$

Typical experimental values are $T_1 = 2574°$ K.   $E_1 = 0.9587$
$T_2 = 2136°$ K.   $E_2 = 0.1862$ from which $k\lambda = 1.117 \times 10^{-4}$.

A second determination of $k\lambda$ using different lamp temperatures has given a value of $k\lambda$ within 0.25% of the above value.

Equation 5 for practical measurement of the temperature of a sample is $$T = \frac{T_L}{1 - 1.117 \times 10^{-4} T_L \log \left[ \frac{E}{E_L} \frac{1}{\epsilon_\lambda} \right]} \quad (7)$$

A typical temperature determination on a pure alumina brick using Equation 7 gives a temperature at the center of the molten puddle of $T = 3023°$ K. For this particular determination the following values were found in Equation 7.

$$\frac{E}{E_L} = 2.76; \quad \epsilon_\lambda = .74; \text{ and } T_L = 2535°K.$$

The actual operation of the pyrometer to obtain the data required for the calculations discussed above may now be described again with reference to the figures and to the equations given above. As has been indicated above, there are in fact two modes of operation of the apparatus and these have two separate uses. These modes will be designated the fast mode and the slow mode.

The optional gearing switch 65 (FIG. 2) allows the pyrometer to be switched into either one of two speeds or modes, a fast mode or a slow mode. In the fast mode the periscope wheel 46 turns at 1800 r.p.m. and the light chopper 56 at 900 r.p.m. Thus the sample and the arc are each sampled twice for each chopping of the arc light. The result is one scan of the sample with the arc light illuminating the sample and the next scan without the arc light illuminating the sample. Typically, these alternate scans recur every 30 milliseconds. The slow mode of operation entails a complete scan cycle of about three seconds with the chopping of the arc light continuing at the same rate that occurs with the fast mode of operation, 900 r.p.m.

The fast mode is useful where a time picture of the temperature and emittance of the sample is desired. In this case the temperature shown will be the highest of the sample, presumably at the center of the hot spot. A typical oscillogram of a fast mode scan is shown in FIG. 8. The sample used was $Al_2O_3$ and the reference light was operated at 50 w. In making the oscillogram traces in FIG. 8 the chopper 56 was rotated at 900 r.p.m. and the periscope wheel 46 at 1800 r.p.m. This means that the reference lamp, the arc and the sample were viewed every 30 milliseconds. Synchronization of the periscope wheel drive 59 and the chopper drive 60 (and hence of the periscope wheel 46 and chopper gear 63) means that on one scan the sample periscope window 43 sees the light emitted and reflected by the sample when the chopper does not obscure the arc, and that on the alternate scan the sample periscope window sees only the light emitted by the sample when the chopper cuts off the radiant energy from the arc.

The sequence in the operation to obtain FIG. 8 begins with turning on the reference light source (trace A). Then the arc is turned on to give trace B. There is no light emitted by the sample at this point since a small finite time is required to heat it. However, there is reflected light which is shown in trace C as amounting to more than the subsequently determined emitted plus reflected light. This initial rise is explained by the fact that it is characteristic of some oxides (among which is $Al_2O_3$) to exhibit much higher reflectance in the solid than in the molten state. Hence the dotted portion of trace C indicates what would be expected if this characteristic was not inherent in $Al_2O_3$.

It will be appreciated that all of the traces in FIG. 8 are in fact made up of small almost invisible alternate samples so that each trace consists of a series of closely spaced but unconnected points or peaks and on an instantaneous basis the galvanometer light beam will be found to be at only one point on the record at any one time. The traces are therefore presented in FIG. 8 diagrammatically with no attempt being made to indicate breaks or precise amplitudes and frequency. Since the ratios of the heights of the traces alone are important, this type of diagrammatic representation is justified.

Once the arc light is suddenly removed, trace C (now representing emitted light only) drops rapidly, but not infinitely fast, to give a cooling curve and a freezing point of the sample. The terminal portion of trace C (after the arc is off) has been designated trace E. First in trace E there appears a short period of supercooling with a sudden slight rise to the actual freezing point. The latent heat of solidification maintains the temperature of the hot spot for a short while and then the sample cools at a normal rate.

In the experiment which resulted in the traces of FIG. 8 the melting temperature of the $Al_2O_3$ sample was found to be 2150° C., the emittance of the freezing spot was determined to be 0.82 (and thus the reflectance was 0.18).

A comparable slow mode operation is shown in FIG. 9, again using $Al_2O_3$ as a sample. In this case the chopper was operated at 900 r.p.m. and the periscope wheel at 18 r.p.m. Each of the radiant energy sources (reference light, arc and sample) is viewed in order to obtain a temperature profile. The brief periodic returns of the tracing of the sample to the base line indicates the periods in time when the chopper prevented the radiant energy from the arc from reaching the sample periscope. In the sample tracing curves A and B are obtained with the arc on and off, respectively, as achieved by the chopper operations. Thus when arc radiant energy is permitted to strike the sample (curve A) it reflects and emits energy. When the arc is cut off (curve B) the sample only emits radiant energy. Dotted lines have been used to complete the two curves A and B since the tracings are intermittent.

It will be appreciated that the reference light source is not required to provide a known amount of radiation, but does serve the function of providing a reproducible although arbitrary amount of radiation. A reference blip which is sharper than the other profiles appears on the oscillogram record at all times. The height of this blip is the value against which all other readings are normalized except in the case where ratios are taken directly off the record and where normalizing is not required. In the case of the temperature determinations, normalizing is required in that drifts in the sensitivity of electronics or photomultiplier would lead to an inaccurate determination of temperature were it not for the reference lamp which provides a true optical reference point on the chart. In practice all absolute readings such as the amount of radiation leaving the sample or the standard lamp are first divided by the amplitude of the reference lamp set at a known wattage input. This normalized number now becomes independent of electronic and photomultiplier drifts and represents a reproducible amplitude which may be relied upon to stay constant from experiment to experiment.

Variations in the rate at which the chopper and periscope wheel are rotated as well as in the rate at which the record of the oscillogram is made are possible and within the scope of this invention. Generally, it will be desirable to adjust the scan time and entire cycle duration to give an oscillogram chart which is a compromise between accuracy and ease of interpretation.

The foregoing description illustrates the preferred embodiments of the method and apparatus of this invention for the accurate measurement of relatively high temperatures. The invention is not limited by these preferred embodiments, but rather by the claims that follow, because many variations will be obvious to those skilled in the art.

I claim:
1. A pyrometer adapted to measure the temperature of a sample heated by a source of radiant flux which is directed onto said sample by an optical path providing an intermediate image of said sample and an intermediate image of said source, comprising in combination:
   (a) radiant energy detecting means;
   (b) sample viewing means adapted to periodically view said image of said sample and to transmit radiant energy therefrom to said radiant energy detecting means;
   (c) source viewing means adapted to periodically view said source of radiant flux and transmit radiant energy therefrom to said radiant energy detecting means;
   (d) chopper means located between said source of radiant flux and said sample viewing means and adapted to periodically cut off said radiant flux from said sample; and
   (e) driving means associated with and coordinating the operation of said sample viewing means, said source viewing means and said chopper means, said driving means being adapted to move said source viewing means and said sample viewing means alternately and successively into positions to view separately said source and said sample image, respectively, and to move said chopper means into positions to alternately block and unblock the flow of said radiant flux from said source to said sample when said sample viewing means is in successive viewing positions, whereby said sample viewing means alternately transmits radiant energy emitted by said sample and radiant energy reflected plus radiant energy emitted by said sample, to said radiant energy detecting means.

2. A pyrometer in accordance with claim 1 wherein said sample viewing means and said source viewing means are mounted on a common rotatable support means such that radiant energy transmitted by them always strikes said radiant energy detecting means in substantially the same place.

3. A pyrometer adapted to be used in conjunction with a sample heated by a source of radiant flux which is directed onto said sample by an optical path providing an intermediate image of said sample and an intermediate image of said source, comprising in combination:
   (a) radiant energy detecting means;
   (b) radiant energy reference means;
   (c) sample viewing means adapted to periodically view said image of said sample and said reference means and to transmit radiant energy therefrom to said radiant energy detecting means;
   (d) source viewing means adapted to periodically view said source of radiant flux and transmit radiant energy therefrom to said radiant energy detecting means;
   (e) chopper means located between said source of radiant flux and said sample viewing means and adapted to periodically cut off said radiant flux from said sample;
   (f) driving means associated with and coordinating the operation of said sample viewing means, said source viewing means and said chopper means, said driving means being adapted to move said source viewing means periodically into and out of position to view said source, to move said sample viewing means periodically into and out of positions to view alternately and separately said sample image and said reference means, and to move said chopper means into positions to alternately block and unblock the flow of said radiant flux from said source to said sample when said sample viewing means is in successive viewing positions, whereby said sample viewing means alternately transmits radiant energy emitted by said sample, radiant energy reflected plus radiant energy emitted by said sample, and radiant energy emitted by said reference means, to said radiant energy detecting means; and (g) means for recording the intensity of said radiant energy transmitted to said radiant energy detecting means.

4. A pyrometer in accordance with claim 3 further characterized by having a light filter adjacent said radiant energy detecting means and in the path of radiant energy directed toward said energy detecting means from said sample viewing means and said source viewing means.

5. A pyrometer adapted to measure the temperature of a sample heated by a source of radiant flux which is directed onto said sample by an optical path providing an intermediate image of said sample and an intermediate image of said source, comprising in combination:

(a) radiant energy detecting means;

(b) sample viewing means comprising an encased curved elongated quartz body which provides total internal reflection and is adapted to periodically view said image of said sample and to transmit radiant energy therefrom to said radiant energy detecting means;

(c) source viewing means comprising an encased curved elongated quartz body which provides total internal reflection and is adapted to periodically view said source of radiant flux and transmit radiant energy therefrom to said radiant energy detecting means;

(d) chopper means located between said source of radiant flux and said sample viewing means and adapted to periodically cut off radiant flux said sample; and (e) driving means associated with and coordinating the operation of said sample viewing means, said source viewing means and said chopper means, said driving means being adapted to move said source viewing means and said sample viewing means alternately and successively into positions to view separately said source and said sample image, respectively, and to move said chopper means into positions to alternately block and unblock the flow of said radiant flux from said source to said sample when said sample viewing means is in successive viewing positions, whereby said sample viewing means alternately transmits radiant energy emitted by said sample, and radiant energy reflected plus radiant energy emitted by said sample, to said radiant energy detecting means.

6. A pyrometer in accordance with claim 5, further characterized in that said sample viewing means and said source viewing means each comprises an elongate quartz body encased in a housing, said housing having a window adjacent one end exposing said quartz and adapted to permit radiant energy to enter, said quartz body having an extension beyond said housing at the other end thereof and adapted to direct said entering radiant energy onto said radiant energy detecting means.

7. The method of measuring the temperature of a sample body heated by a source of radiant flux which is directed on said sample body through an optical path such that there is provided in said optical path images of said source and of said sample body, comprising the steps of alternately viewing the image of said source and the image of said sample body, chopping said radiant flux reaching said sample body whereby said viewing of said sample body comprises alternately viewing said sample body with and without said radiant flux striking it, and determining the relative intensities of the radiant energy emitted by said source, of the radiant energy emitted and reflected by said sample body when said radiant flux strikes it and of the radiant energy emitted by said body when said radiant flux is cut off by said chopping.

References Cited in the file of this patent

UNITED STATES PATENTS

| | | |
|---|---|---|
| 2,410,104 | Rainey | Oct. 29, 1946 |
| 2,426,716 | Morton et al. | May 20, 1947 |
| 2,825,260 | O'Brien | Mar. 4, 1958 |
| 2,843,008 | Moutet | July 15, 1958 |
| 2,871,758 | Moutet | Feb. 3, 1959 |
| 2,886,970 | Munker | May 19, 1959 |
| 2,927,502 | Watrous | Mar. 8, 1960 |
| 3,051,035 | Root | Aug. 28, 1962 |